United States Patent [19]

Bergstrom et al.

[11] Patent Number: 5,854,356
[45] Date of Patent: Dec. 29, 1998

[54] POLYMERS FOR RELEASE FILMS ON SURFACES CONTAINING PRESSURE-SENSITIVE ADHESIVES

[75] Inventors: Christer Bergstrom, Espoo; Stefan Jakobsson, Pietarsaari; Marja-Leena Markkula, Ostersundom; Ake Jafs, Pietarsaari; Inari Seppa, Porvoo, all of Finland

[73] Assignee: Neste Oy, Espoo, Finland

[21] Appl. No.: 449,775

[22] Filed: May 24, 1995

Related U.S. Application Data

[63] Continuation-in-part of Ser. No. 104,177, Aug. 9, 1993, abandoned, which is a continuation of Ser. No. 781,980, Oct. 24, 1991, abandoned.

[30] Foreign Application Priority Data

Oct. 29, 1990 [FR] France ........... 90 5345

[51] Int. Cl.$^6$ ............... C08F 8/00; C08L 43/00
[52] U.S. Cl. ............ 525/326.5; 525/101; 525/328.8; 525/329.7; 525/330.3; 525/342
[58] Field of Search ............... 525/101, 326.5, 525/328.8, 329.7, 329.9, 330.3, 330.5, 342, 383, 384, 385, 386, 374, 379

[56] References Cited

U.S. PATENT DOCUMENTS

| | | |
|---|---|---|
| 3,277,036 | 10/1966 | Whitworth, Jr. . |
| 3,563,953 | 2/1971 | Lehmann ................. 524/365 |
| 3,914,208 | 10/1975 | Carlos .................. 525/328.8 |
| 4,151,319 | 4/1979 | Sackoff . |
| 4,608,306 | 8/1986 | Vincent . |
| 4,851,463 | 7/1989 | Opsahl ................... 524/322 |
| 4,960,810 | 10/1990 | Foster ................... 524/265 |
| 4,983,675 | 1/1991 | Ishino .................... 525/288 |
| 5,089,564 | 2/1992 | Bullen ................. 525/326.5 |
| 5,169,900 | 12/1992 | Gudelis .................. 525/106 |

FOREIGN PATENT DOCUMENTS

| | | |
|---|---|---|
| 12186 | 2/1975 | Japan . |

*Primary Examiner*—Christopher Henderson
*Attorney, Agent, or Firm*—Steinberg & Raskin, P.C.

[57] ABSTRACT

The invention relates to a polymer for release films of surfaces containing pressure-sensitive adhesives. The polymer includes a reactive polyolefin and a reactive release substance, which are chemically bonded together as a result of being compounded in a molten state. The invention also relates to a release film for surfaces containing pressure-sensitive adhesives.

15 Claims, No Drawings

POLYMERS FOR RELEASE FILMS ON SURFACES CONTAINING PRESSURE-SENSITIVE ADHESIVES

CROSS REFERENCE TO RELATED APPLICATIONS

This application is a continuation-in-part of U.S. patent application Ser. No. 08/104,177 filed Aug. 9, 1993, now abandoned, which, in turn, is a continuation of U.S. patent application Ser. No. 07/781,980, filed Oct. 24, 1991, now abandoned.

FIELD OF THE INVENTION

The present invention relates to polymers for release films which can be prepared for surfaces containing pressure-sensitive adhesives.

BACKGROUND OF THE INVENTION

Release covers are used in labels, floor slabs, wallpapers, plasters, stickers, etc. Release covers are traditionally made of kraft paper which is coated with silicone. A silicone polymer and a catalyst are spread on the base material and the final polymerization occurs by heating and/or irradiation. The silicone coating is crosslinked as a uniform surface and anchored to the subweb.

As the processing speeds and automatic label applications have increased, a low tensile strength, a varying thickness, and an uneven surface place limitations which have become important.

Precoated release papers, which are papers coated with polyolefins on one or both sides, have solved part of the above-mentioned problems. In this case, the paper is first coated with a polyolefin and thereafter with silicone, i.e., two separate coating steps are needed, as described in the U.S. Pat. No. 3,403,045. In addition, the silicone treatment requires a catalyst.

Polyester films are also used in release films, most often polyethylene terephthalate, which are coated with a silicone polymer. According to the U.S. Pat. No. 453,366, the film is treated by irradiating it in an inert atmosphere before spreading the silicone. In any case, polyester films can also be coated without irradiation (FI 8893868), when a certain polydiorganosiloxane is used.

U.S. Pat. No. 4,859,511 describes a release film, the base of which can be a paper, nonwoven, plastic film, or an extrusion coated paper, which is precoated before spreading the release substance. The precoating material is polar, e.g., polybutadiene or polyisoprene. The silicone coating is spread after the precoating and dried or hardened depending on the properties of the silicone.

EP publication 251,483 describes a fluorosilica polymer which can be used as a release substance on various base materials, such as paper, various plastic films and metals. The release substance is spread on the base material and hardened.

Polyolefin films can also be used in release films. However, the siliconization has to be performed as a separate processing step and irradiation and/or heating is needed for fixing the silicone. The temperature is relatively high, generally about 150° C., and the properties of the polyolefin deteriorate.

SUMMARY OF THE INVENTION

It is therefore an object of the present invention to provide a polymer for release films.

It is another object of the present invention to provide a polymer for release films of surfaces containing pressure-sensitive adhesives.

The present invention solves the above problems related to known release films and others in a very simple manner. Instead of using a separate base material, which is coated with a release substance, such as silicone, the invention provides a new thermoplastic polymer, which acts as a release substance and whose treatment properties correspond to the treatment properties of LDPE. It can thus be formed directly as a release film by means of a conventional film preparation technique.

The polymer developed for the preparation of the release films of the present invention is comprised of a reactive polyolefin containing functional groups and a reactive silicone or some other reactive release substance, which are caused to react with each other by compounding in a molten state. In this way, it is possible to make the silicone or some other release substance chain join to the polyolefin chain.

For example, a polyethylene containing a reactive group is made to form a chemical bond with a silicone containing a reactive group. In this way, a fundamentally new thermoplastic polymer composed of two macromolecular segments, i.e., polyethylene and silicone, is formed. The polyethylene portion provides the properties of extrudability and mechanical strength while the silicone portion provides release properties. This thermoplastic (re-meltable) release polymer can be extruded to a thermoplastic (re-meltable) release film.

The polymers of the present invention, which are obtained by compounding a reactive polyolefin with a reactive release substance in molten state, are to be contrasted with polymer mixtures which do not contain release substances chemically bound to polyolefins. Thus, since the inventive polymers are formed by compounding macromolecular segments containing reactive functional groups in molten state, chemical bonds are formed which result in a new reaction polymer. This is completely unlike mere polymer-silicone mixtures where no bonds are formed.

DETAILED DESCRIPTION

In accordance with the present invention there is provided a polymer for use in a release film for surfaces containing pressure-sensitive adhesives. The polymer is prepared by a process which includes compounding:

a) a reactive polyolefin containing a functional group selected from the group consisting of acid, acid anhydride, silane, hydroxy, epoxy, amino, ketene and isocyanate groups; and b) a reactive release substance capable of reacting with said reactive polyolefin and having functional groups selected from the group consisting of silanol, carbinol, alkoxysilane, acid, amino epoxy, hydrogen silane, ketene and isocyanate groups;

in a molten state whereby the reactive polyolefin is chemically bonded to the reactive release substance.

The reactive polyolefin can be any polyolefin to which a reactive organic compound can be joined such as by copolymerization, grafting or some other means by joining to the polymer chain. Organic compounds suitable for this purpose may be compounds which contain an acid or acid anhydride, silane, hydroxyl, amino, epoxy, ketene, or any other groups which react with reactive silicones or other release substances.

Examples of suitable polyolefins for use in the inventive polymers include copolymers of ethylene and carboxyl acids or carboxyl acid derivatives, such as ethylene-acrylic acid and ethylene-methacrylic acid copolymers, ethylene-butyl acrylate, ethylene-ethyl acrylate, ethylene-methyl acrylate, ethylene-hydroxyethyl methacrylate, and ethylene-glycidyl methacrylate. Also suitable are copolymers of ethylene and vinyl alcohol as well as copolymers of ethylene and hydrolyzable silanes, such as ethylene-vinyl trimethoxy silane copolymers. The ethylene copolymers may also be grafted with acids or acid anhydride, e.g., carboxyl acids. Examples of these include ethylene-butyl acrylate copolymers grafted with carboxyl acids. In some preferred aspects, the polyolefin is a copolymer or graft polymer of ethylene.

Reactive release substances include materials such as silicones, fatty acid compounds, fluoropolymers or other substances which contain acid or acid anhydride, ketene, epoxy, hydroxy (silanol or carbinol), amino or hydrogen groups, which are bound thereto, or any reactive groups, which can react with reactive polyolefins. These groups can be located at the ends of the chains (primary groups) or as side groups (secondary groups). Also, unsaturated groups are possible, since they can be grafted to polyolefins, or silicones or other release substances can be caused to remain in the polyolefin by means of long paraffinic groups without a chemical reaction.

In those aspects of the invention where the reactive polyolefin is an ethylene-silane copolymer, the reactive release substance is preferably selected from the group consisting of silicone containing glycidyl groups, silicone containing hydroxyl groups, silicone containing hydroxyl groups with dibutyl tin dilaureate, polymethyl hydrogen siloxane-based silicone and unmodified ethylene-vinyl trimethoxy silane copolymers. Furthermore, when the reactive polyolefin is an ethylene-hydroxyethyl methacrylate copolymer the reactive release substance is preferably selected from the group consisting of silicone containing glycidyl groups, polymethyl hydrogen siloxane-based silicone, epoxidized soybean oil, alkyl ketene dimer, alkyl ketene dimer diluted with high density polyethylene, and unmodified ethylene-hydroxyethyl methacrylate copolymers.

By compounding the reactive polyolefins and reactive release substances in a molten state, a new release polymer is obtained. The polymer is a reaction polymer product which can be delivered to film manufacturers in a granulated form. The compounding can be performed with a Bambury mixer, a continuous mixer, a twin-screw compounding device, or any compounding devices whose temperature and delay time are sufficient for causing the reactive components to fully react with each other and form a chemical bond linking the components and form a new thermoplastic polymer. In certain cases, the chemical reaction/reactive compounding step can also be performed in connection with the film preparation. Furthermore, the compounding of the reactive polyolefin and the release substance can also include catalyzing the condensation of silanol groups by means of water and a silanol condensation catalyst.

Preferred polymers of the present invention include an ethylene-alkoxysilane co- or terpolymer as the reactive polyolefin and a silicone containing silanol groups as the release substance. Still other preferred polymers of the present invention include a reactive polyolefin such as an ethylene-hydroxyalkyl (meth)acrylate co- or terpolymer and a release substance containing ketene groups.

In other preferred aspects, the reactive polymer is ethylene-hydroxyalkyl acrylate or ethylene-hydroxyalkyl acrylate mixed with a suitable amount of high density polyethylene, and the release substance is an alkyl ketene-dimer wax. Still further aspects of the invention include the reactive polymer being ethylene hydroxyalkyl acrylate or ethylene hydroxyalkyl methacrylate and the release substance being an alkyl ketene dimer wax. Another aspect of the invention includes ethylene alkoxysilane polymer as the reactive polymer and a silicone containing silanol groups as the release substance.

A release film is a film (monofilm, co-extruded film, laminated film of (co)extrusion coated web), whose surface layer is a release compound. The film can also be prepared by means of a blown-film, cast-film, or extrusion coating technique, whereby the subweb can be paper, aluminum, plastic, or any other subweb suitable for extrusion coating.

In the inventive polymer, the quantity of the reactive release substance can vary within the range of from about 0.1 to about 20% by weight, although the suitable quantity can generally be selected within the range from about 1 to about 20% and preferably from about 3 to about 20% by weight. If higher amounts of release-substance contents are included, the reaction polymer becomes too crosslinked.

Release films prepared in accordance with the present invention will therefore contain the new thermoplastic polymers described herein, i.e., a reactive polyolefin containing functional groups chemically bonded to a reactive silicone or some other reactive release substance as a result of being compounded in a molten state. The release films can also include a mixture of this polymer and an unmodified polyolefin. The release films of the present invention can also be prepared by coextruding the inventive polymer described herein on the surface of a film material.

The tape with which the release film is used can be rubber- or acrylic-based or any tape which is sued for technical applications (e.g., as a backing film for emery paper, in which case the tape has to adhere to steel), for packing purposes (e.g., as a backing film for labels, in which case the tape has to adhere to glass, PVC, PET, etc.), and for hospital purposes (e.g., as a backing film for EKG-electrodes, in which case the tape has to adhere to skin).

DETAILED DESCRIPTION OF THE PREFERRED EMBODIMENTS

The following examples illustrate various aspects of the present invention. They are not to be construed to limit the claims in any manner whatsoever. These non-limiting examples have been given below for illustrating the invention which, with respect to release/adhesion properties, have been tested as follows:

The Release Polymers

The release polymers were made with a Bambury mixer (200° C., 10 minutes) and pressed into sheets with a thickness of 2 mm. Rubber-based standard testing tape (Beyersdorf's TESA4154) was pressed onto these sheets such that the pressure was 70 g/cm$^2$, time: 20 hours, and temperature: 23° C. The adhesion (release force) between the release-polymer sheets and the tape was tested with an Instron pulling device when the pulling speed was 300 mm/minutes (180° peel test) and the release value was given in N/cm. The same was done for PVC and PET as above. The readhesion was measured in the same way.

The following reactive polyolefin grades were used:

NCPE0414 Acid-grafted 17% ethylene-butyl acrylate

NCPE6664 Ethylene-vinyl trimethoxy silane (2%) copolymer

NCEP0465, Neste Ethylene-hydrodroxyethyl methacrylate (8%) copolymer

Primacor 3340, Dow Ethylene-acrylic acid (9%) copolymer

The following reactive release substances were used:

L-9300, Union Carbide Silicone containing glycidyl groups

DC-109, Dow Corning Silicone containing hydroxyl groups (primary silanol)

MH-15, Bayer Polymethyl hydrogen siloxane based silicone

Reoplast 39, Ciba-Geigy Epoxidated soybean oil

AKD, Raisio Alkyl ketene dimer

SLM 52-173, Wacker Chemie Silicone containing silanol groups

FD 350, Wacker Chemie Silicone containing silanol groups

FD 80, Wacker Chemie Silicone containing silanol groups

EXAMPLE 1

Various release substances were compounded in molten state with a reactive ethylene-silane copolymer (NCPE6664). The reaction polymers were then tested for adhesion and the results are provided in Table 1 below.

TABLE 1

| RELEASE SUBSTANCE | (N/cm) ADHESION OF POLYMER TO TAPE GLASS | (N/cm) ADHESION OF TAPE TO BASE |
|---|---|---|
| 3% L9300 | 0.63 | 1.9 |
| 3% DC-109 | 0.72 | 1.7 |
| 3% DC-109 + 0.1% DBTDL | 0.53 | 2 |
| 3% MH-15 | 0.62 | 1.5 |
| Unmodified NCPE6664 | 1.4 | 1.9 |

Table 1 shows that when reactive release substances are compounded in molten state with a reactive polyolefin, the tape can be easily released and relatively good adhesion results to glass are obtained.

An advantageous polymer is obtained with using DC-109, and the results are further improved when the condensation catalyst DBTDL (dibutyl tin dilaureate) for silanols is used.

EXAMPLE 2

Ethylene-hydroxyethyl methacrylate copolymer-based (test grade NTR-354) polymers were prepared with various release substances. These mixtures deviate from those of Example 1 in that the quantity of reactive groups is very large. Thus, considerably more reactive release substances can be added and possible diluted subsequently, e.g., with HDPE. The results are provided in Table 2.

TABLE 2

| RELEASE TAPE SUBSTANCE | (N/cm) COMPOUND ADHESION | ADHESION OF TAPE TO BASE (N/cm) | | | |
|---|---|---|---|---|---|
| | | Steel | Glass | PVC | PET |
| 6% L-9300 | 0.31 | 1.6 | 1.2 | 1.6 | 1.1 |
| 6% MH-15 | 0.42 | 1.2 | 1.7 | 1.3 | 1.6 |
| 6% Reoplast 39 | 0.41 | 1.5 | 1.9 | 1.5 | 1.3 |
| 6% AKD | 0.2 | 1.8 | 2 | 1.6 | 1.4 |
| 6% AKD + 50:50 dilution with HDPE | 0.21 | 2.6 | 2.3 | 2.0 | 1.8 |
| Unmodified NTR-354 | 1.6 | 1.7 | 1.8 | 1.1 | 1.0 |

Table 2 shows that large quantities of reactive release substances can be easily chemically bound (joined) to the hydroxy group without the deterioration of the adhesion properties of the tape. In addition, the results show that the inventive polymers can be diluted and still maintain the release properties.

EXAMPLE 3

The effect of the viscosity of the release substance on the release force was examined. In all three silicones used, the reactive part was silanol. However, the viscosities deviated considerably from each other. The results are set forth in Table 3.

TABLE 3

| POLYMER + RELEASE AGENT | VISCOSITY | WATER TREATMENT | ADHESION TO TAPE (N/cm) STEEL | ADHESION TO BASE (N/cm) GLASS |
|---|---|---|---|---|
| NCPE 66664 + SLM 52-173 5% | 650 Brabender | + | 0.37 | 2.3 3.36 |
| | | − | 0.77 | 2.1 3.77 |
| FD 360 6% | 300,000 mm²/s | + | 0.49 | 2.1 3.76 |
| | | − | 0.71 | 1.07 1.87 |
| FD 80 6+ | 7,500 mm²/s | + | 0.75 | 2.47 3.96 |
| | | − | 1.02 | 1.87 2.64 |

+: water treatment used (2 hours, in 90° C. water)
−: no water treatment used

SLM 52-173, which has the highest polymerization degree (viscosity), produces the best release properties. The release properties improve as the viscosity of the release substance increases.

Table 3 also shows that the release properties can be improved further by means of the water treatment.

EXAMPLE 4

Finally, a 3-layer film was made with blown-film techniques. The structure of the film was:

15 μm EBA/10 μm HDPE/15 μm release polymer.

EBA was Neste's grade NCPE6417 containing 17% of butyl acrylate, and HDPE was NCPE7007. The premise was that the layer thickness of the release mixture would be as small as possible so that the product would be cheap and the migration would be less detrimental. EBA was used as the second outer layer to make the unreacted release substance absorb into it. The HDPE middle layer in turn gives the product stiffness, which improves the release properties.

Table 4 shows the results of the two 3-layer films.

TABLE 4

| POLYMER + RELEASE SUBSTANCE | ADHESION (N/cm) | ADHESION TO BASE (N/cm) | | | |
|---|---|---|---|---|---|
| | | Steel | Glass | PVC | PET |
| NCPE6664 + 6% DC-109 | 0.68 | 0.74 | 1.7 | 1.1 | 0.62 |
| Primacor 3440 + 6% DC-109 | 1.0 | 0.56 | 1.7 | 1.4 | 0.33 |

The results show that coextruded films also have release properties and after the loosening, the tape adheres well, especially to glass.

The examples provided above are not meant to be exclusive. Many other variations of the present invention would be obvious to those skilled in the art, and are contemplated to be within the scope of the appended claims.

What is claimed is:

1. A polymer prepared by the process comprising reacting in a molten state:
   (a) a copolymer selected from the group consisting of ethylene-acrylic acid, ethylene-methacrylic acid, ethylene-butyl acrylate, ethylene-ethyl acrylate, ethylene-methyl acrylate, ethylene-hydroxyethyl methacrylate, ethylene-hydroxyethyl acrylate, ethylene-glycidyl methacrylate, ethylene-vinyl alcohol and ethylene-vinyl trimethoxy silane; and
   (b) a reactive release substance selected from the group consisting of silicone containing glycidyl groups, silicone containing hydroxyl groups and silicone containing amino groups.

2. The polymer of claim 1, wherein said reactive release substance is a silicone containing glycidyl group.

3. The polymer of claim 1, wherein said reactive release substance is a silicone containing hydroxyl group.

4. The polymer of claim 1, wherein said reactive release substance is a silicone containing amino group.

5. The polymer of claim 1, wherein said functional group of said reactive release substance is reacted to said copolymer.

6. The polymer of claim 1, wherein said copolymer is ethylene-acrylic acid.

7. The polymer of claim 1, wherein said copolymer is ethylene-methacrylic acid. acid.

8. The polymer of claim 1, wherein said copolymer is ethylene-butyl acrylate.

9. The polymer of claim 1, wherein said copolymer is ethylene-ethyl acrylate.

10. The polymer of claim 1, wherein said copolymer is ethylene-methyl acrylate.

11. The polymer of claim 1, wherein said copolymer is ethylene-hydroxyethyl methacrylate.

12. The polymer of claim 1, wherein said copolymer is ethylene-hydroxyethyl acrylate.

13. The polymer of claim 1, wherein said copolymer is ethylene-glycidyl methacrylate.

14. The polymer of claim 1, wherein said copolymer is ethylene-vinyl alcohol.

15. The polymer of claim 1, wherein said copolymer is ethylene-vinyl trimethoxy silane.

* * * * *